Feb. 20, 1940. LE BARON B. JOHNSON 2,191,019
FEEDING MEANS AND METHOD
Filed Sept. 16, 1938 3 Sheets-Sheet 1
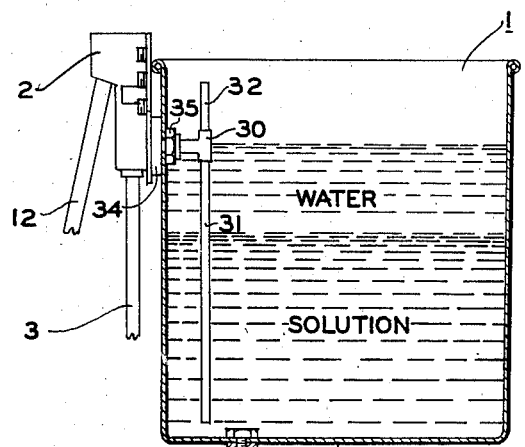
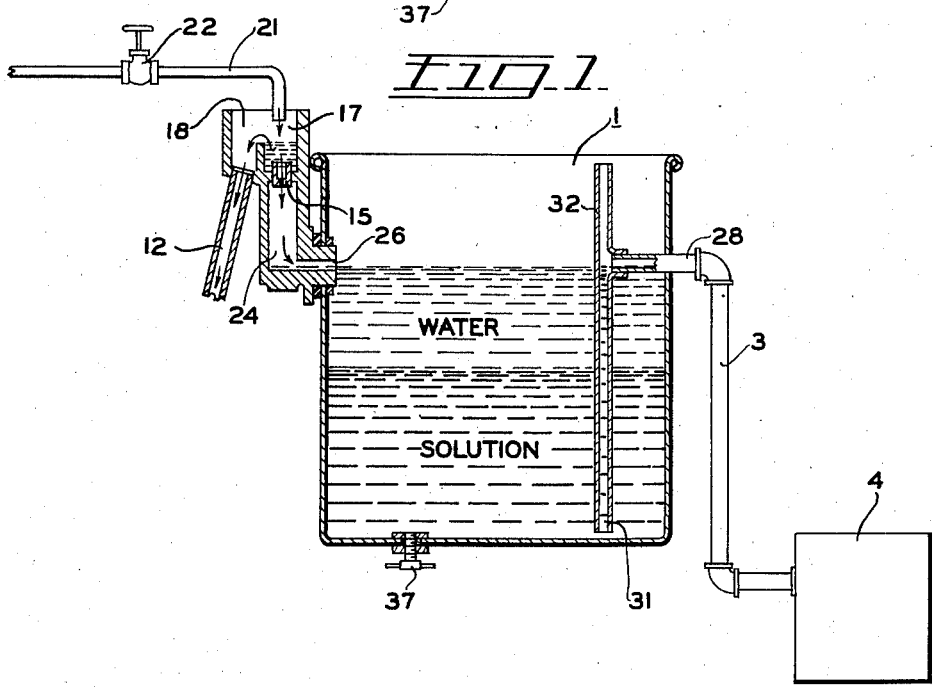
Inventor
LE BARON B. JOHNSON Feb. 20, 1940.  LE BARON B. JOHNSON  2,191,019
FEEDING MEANS AND METHOD
Filed Sept. 16, 1938     3 Sheets-Sheet 2
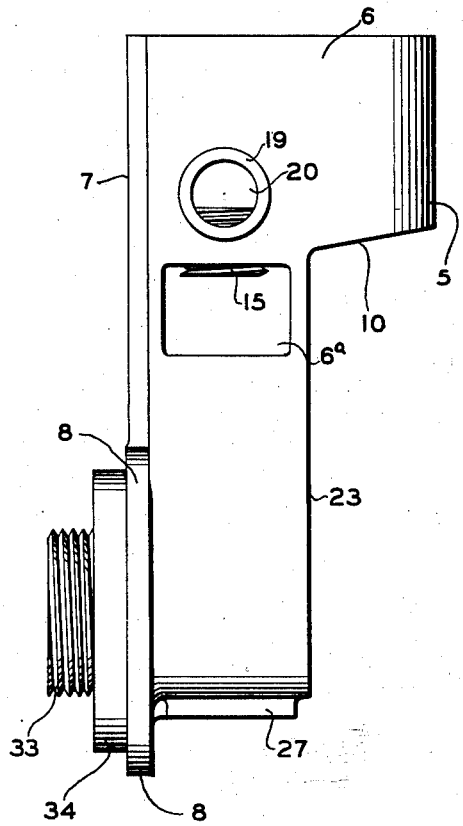
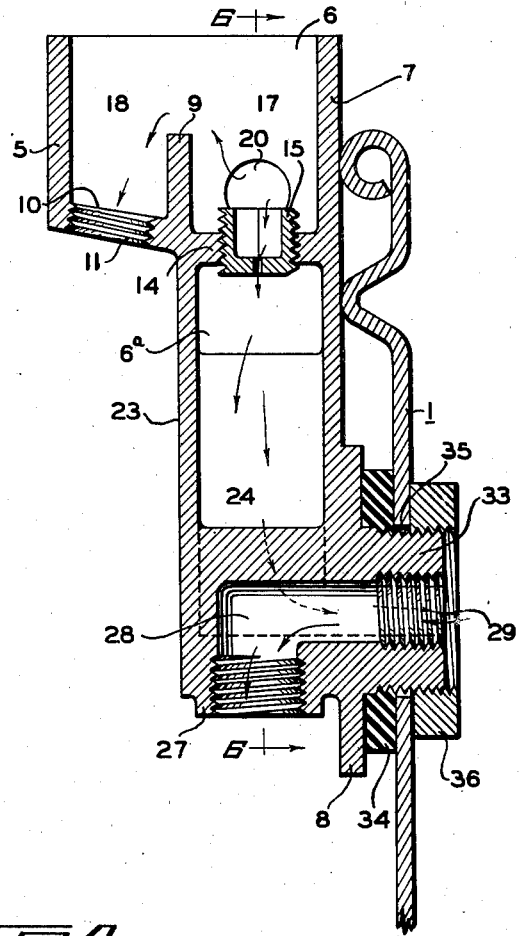
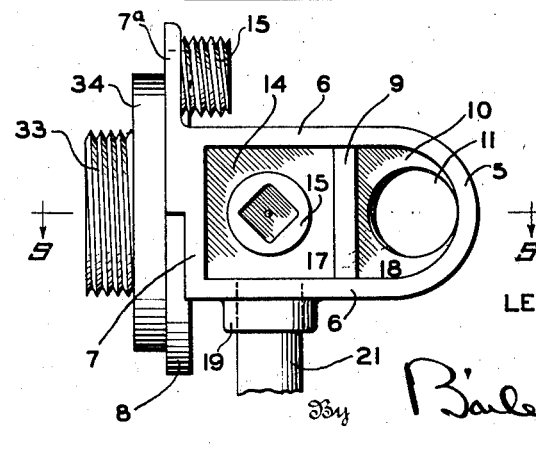
Inventor
LEBARON B. JOHNSON
By Barley & Larson
Attorneys

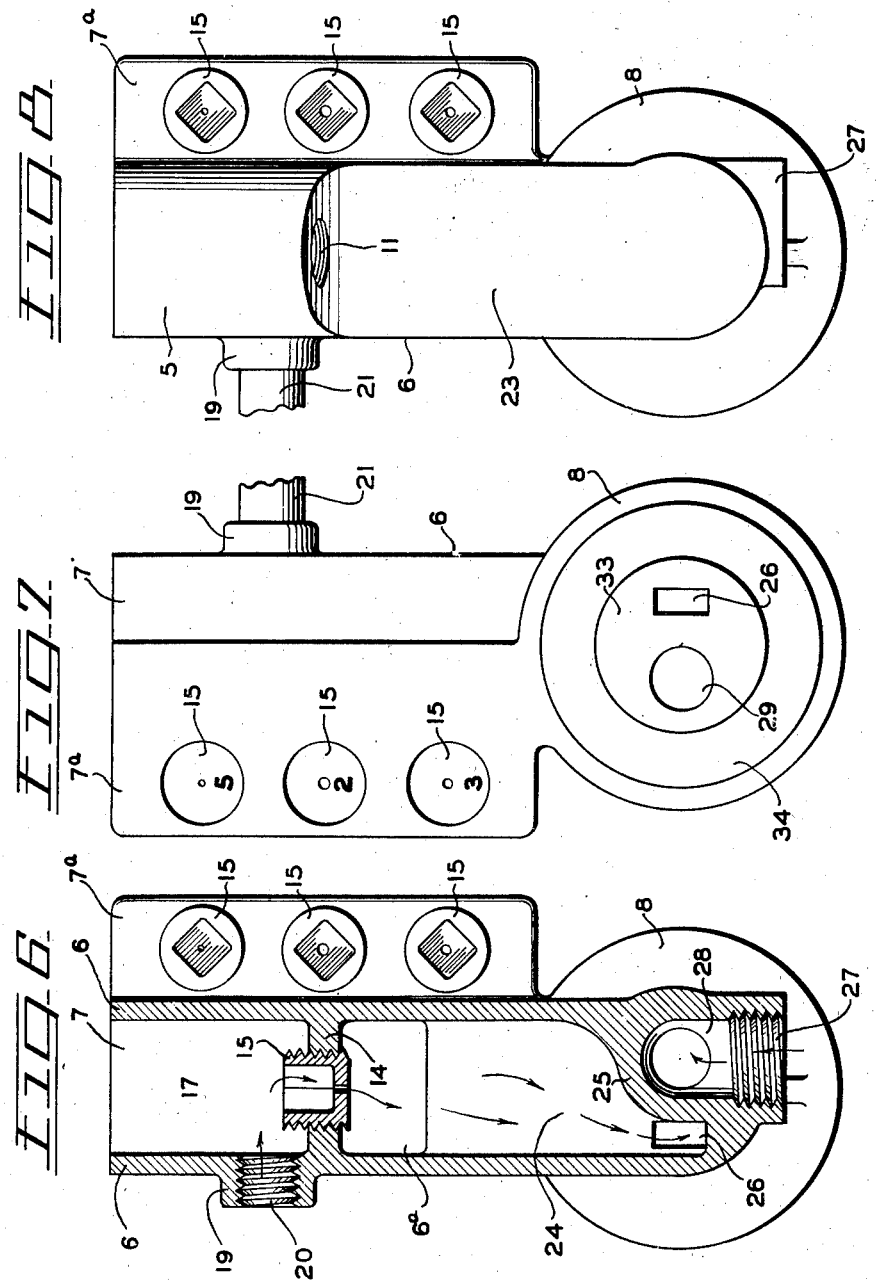

Patented Feb. 20, 1940

2,191,019

UNITED STATES PATENT OFFICE 2,191,019

FEEDING MEANS AND METHOD

Le Baron B. Johnson, Bronxville, N. Y.

Application September 16, 1938, Serial No. 230,323

5 Claims. (Cl. 137—21)

This invention relates to feeding means, and in particular to means for feeding liquid cleaning compounds, at predetermined, constant or uniform rates, to washing apparatus or the like.

It is an object of this invention to provide feeding means of simple construction and particularly adapted for supplying or feeding liquid compounds which are heavier than water.

It is a further object of this invention to provide such means which operates upon the displacement principle, wherein the delivery of liquid solution is effected through displacement of the fluid by metered water supplied thereabove at a predetermined, constant or uniform rate of flow.

It is a further object of this invention to provide such means for supplying a chemical solution to washing machines or the like, wherein the concentration of the delivered chemical solution is constant and unvarying.

It is a further object of this invention to provide such means wherein the operation thereof is totally independent of the manual operation or setting of valves for determining the rate of flow.

It is a further object of the invention to provide such means wherein the concentration of the chemical solution and the rate of delivery thereof remains uniform regardless of the temperature of the water supplied thereto for effecting delivery of the chemical solution.

It is a further object of this invention to provide such means which is capable of delivering automatically a charge of cleaning fluid whereby to obviate the necessity for directly charging washing apparatus before initiating operation thereof under the control of the chemical solution supplying means.

It is a further object of this invention to provide a new and useful method for supplying cleaning fluid at predetermined uniform rates.

It is a further object of this invention to provide in a means of the class described a metering device adapted for supplying metered solution displacing water at predetermined uniform rates totally independently of the temperature or rate of supply of water supplied thereto.

These and other objects and advantages of the invention will appear from the following discussion taken with the drawings.

In the drawings:

Fig. 1 is a diagrammatic view illustrating the means and method comprising this invention;

Fig. 2 is a fragmentary view of the solution supply tank in section with the regulator means of this invention applied thereto and shown in elevation;

Fig. 3 is a view in side elevation of the regulator device shown in Fig. 2 as seen from the side opposite that shown in Fig. 2;

Fig. 4 is a top plan view of the structure shown in Fig. 3;

Fig. 5 is a vertical section taken on the line 5—5 of Fig. 4;

Fig. 6 is a section taken on the line 6—6 of Fig. 5;

Fig. 7 is a view in elevation of a device shown in Fig. 3 as seen from the left of Fig. 3 looking toward the right; and Fig. 8 is a view similar to Fig. 7 of a device of Fig. 3 as seen from the right looking toward the left.

Referring to the drawings in detail, and with reference particularly to Figs. 1 and 2, it will be seen that the apparatus of the invention consists broadly of the cleaning solution supply tank 1 and the regulator device 2 secured thereto and adapted, by displacement, to deliver cleaning solution from the tank 1 through the solution delivery means 3 to any suitable washing apparatus or the like designated 4 in Fig. 1.

The regulator device 2 is a single unit including metering means for metering and supplying displacement water at a predetermined rate to the tank 1 and also solution delivery means 3 responsive to the water metering and supplying means to deliver solution from the tank 1 to the washing apparatus 4 also at a constant predetermined rate. This unit comprises a casting having at the upper end thereof a compartment formed by the annular wall portion 5, the side walls 6, and the main wall 7 which extends throughout the length of the casting and which terminates at the lower end of the casting in the circular flange 8. The side walls 6 are joined at an intermediate portion of the compartment by a separator wall 9 which terminates at a substantial distance from the upper edges of the walls 5, 6 and 7 as shown in Fig. 5.

The portion of the compartment between the separator wall 9 and the arcuate wall 5 is provided wtih an inclined lower wall 10 having therein an inclined screw-threaded bore 11 adapted to receive the overflow drain-line 12 as shown in Fig. 2.

At the side of the separator wall opposite the wall 10 is the substantially horizontal wall 14 which is provided with a screw-threaded aperture for receiving interchangeable metering plugs 15 as shown in Figs. 5 and 6. The chamber formed by the bottom wall 14, separator wall 9, side walls 6 and wall 7 is the metering chamber of the device while the other chamber formed by the bottom wall 10, separator wall 9, side walls 6 and arcuate wall 5 is the overflow chamber of the device. For convenience, the metering chamber is designated 17 and the overflow chamber 18 in Figs. 4, 5 and 6.

One of the side walls 6 is provided with a boss 19 having therein a screw-threaded aperture 20 leading to the metering chamber 17 and which screw-threaded aperture is adapted, as shown in Fig. 7, to receive the water supply line 21, which may, as shown in Fig. 1, be provided with a suitable water supply control valve 22.

The operation of the metered water supply means is shown diagrammatically in Fig. 1 wherein it will be seen that water supplied under the control of the valve 22 through the water supply line 21 passes into the metering chamber 17 and any excess water flows over the separator wall 9 into the overflow chamber 18 and thence escapes through the overflow drain-line 12. The metering chamber 17 provides a free column of water of predetermined height above the metering plug 15 at all times.

As the height of the free column of water in the metering chamber 17 is constant and unvarying, the rate of flow of water from the metering chamber 17 is likewise at all times constant. The side walls 6 of the casting extend downwardly to the bottom of the casting as does also the wall 7 as described above. Below the bottom wall 14 of the chamber 17, the casting is provided with a wall 23 which is parallel with the wall 7, as shown in Fig. 5. The wall 23 with the walls 6 and the wall 7 form a passage 24 having the inclined side wall 25 forming a portion of the lower end thereof, and this passage 24 terminates in a horizontal passage, as shown in Fig. 6, which terminates in the rectangular slot 26.

As shown in Fig. 1, the slot 26 communicates with the interior of the supply tank 1 whereby metered water flowing from the metering chamber 17 is delivered to the interior of the supply tank 1 above the solution therein. This aperture 26 is disposed at the surface of the liquid column which is at all times maintained constant. At its lower end, adjacent the flange 8, the casting is provided with a rectangular boss 27 having therein a screw-threaded aperture for receiving the delivery pipe 3, as shown in Fig. 2. This screw-threaded aperture is disposed at one end of an L-shaped passage 28 which terminates at the other end in the screw-threaded aperture 29 which is adapted to receive the T connection 30 which has the up-take pipe 31 extending downwardly therefrom and the vent pipe 32 extending upwardly therefrom, as shown in Fig. 2.

The true disposition of the parts, when assembled, is illustrated in Figs. 2 and 5, while the showing in Fig. 1 is made diagrammatic for the purpose of illustration in order that the metering means and delivery or supply means may be shown in the same view. The chamber 24 is in communication with the atmosphere due to the provision in the wall 6 thereof of the side windows or apertures 6a, as shown in Figs. 3, 5 and 6. It is thus to be noted that the compartment comprising chambers 17 and 18, the chamber 24 and the tank 1 are all open to the atmosphere.

That portion of the casting in which the delivery passage 28 and the metering chamber passage leading to the aperture 26 is disposed is formed as a screw-threaded boss 33 about which is disposed the resilient washer 34 for providing resilient connection between the flange 8 and the wall of the tank 1 adjacent the aperture 35 through which the screw-threaded boss 33 extends. This is shown in Fig. 5. A nut 36 screwthreadedly engaging the end of the screw-threaded boss 33 provides means for tightly securing the casting to the tank 1, as shown in Fig. 5.

As shown in Figs. 4, 6, 7 and 8, the wall 7 is provided with an extension 7a having therein suitably spaced screw-threaded apertures for receiving a plurality of metering plugs 15 which are interchangeable with the plug 15 in the screw-threaded aperture in the wall 14, as shown in Fig. 6. These metering plugs 15 are all provided with suitable indicia on the lower outer surface thereof, as shown in Fig. 7, for indicating the size of the graduated metering aperture therein. As shown in Fig. 7, the plugs are marked 2, 3 and 5, respectively, and the size of the apertures therein is such that under the influence of a constant head thereabove in the metering chamber 17, a quantity of water sufficient to fill the tank 1 to the predetermined level shown in Figs. 1 and 2 will pass through the number 2 plug in a period of two hours. The same quantity will pass through the number 3 plug in a period of three hours and through the number 5 plug in a period of five hours.

The provision of the vent pipe 32 in the fluid delivery prevents the occurrence of siphoning phenomena so that the weight of water above the solution causes the solution to rise in the up-take pipe 31 to a level equal to the level in the tank 1. Thus, when the level in the tank 1 rises above the predetermined level, the solution passes over to the delivery pipe 3 whence it is delivered to the washing apparatus 4, as shown in Fig. 1.

As above described, water is supplied to the tank 1 at a predetermined uniform rate from the metering chamber 17, and this water displaces the solution in the tank 1 at a likewise uniform rate and causes it to pass up the up-take pipe 31, through the passage 28 and to the delivery pipe 3. Thus, the rate of delivery of fluid from the delivery pipe 3 is equal, at all times, to the rate of supply of water from the metering chamber 17, and as the rate of supply of water from the metering chamber 17 is always constant or uniform, the rate of delivery of fluid from the delivery pipe 3 is likewise constant, uniform and of a value determined by the area of the orifice in the metering plug 15 disposed in the bottom wall 14 or the metering chamber 17.

The solution supply tank 1 is provided with suitable drain plug means 37 in its lower wall for a purpose which will hereinafter appear.

Operation

In the operation of a washing machine for bottles, jars, milk cans and the like, it is necessary to add cleaning compound or solution to the solution tank of the washer as the initial charge. In the operation of the apparatus of this invention, the solution may be added to the solution tank of washing apparatus 4 before operation thereof is begun. After the solution tank of the washing apparatus 4 is suitably charged with cleaning solution, it is then necessary to charge the tank 1.

The tank 1 is charged by adding thereto the desired amount of cleaning solution. The quantity of solution added may be sufficient to bring the fluid level to the point shown in Figs. 1 and 2, but, if not, then sufficient water may be added to bring the fluid surface to that point. As will be understood, the level of the delivery column of solution will be maintained at the same level as the fluid surface because of the provision of the vent pipe 32 in the fluid delivery. When the fluid level has been brought to the desired point, water is then admitted to the metering chamber 17 of the regulator device from the pipe 21 and the rate of flow of the inlet water is made slightly greater than the rate of flow of water through the orifice in the metering plug 15. The excess water will flow over the separator wall 9 into the overflow chamber 18 and thence through the overflow drain line 12, as shown in Fig. 1.

However, water will be delivered from the metering chamber 17 through the orifice in the metering plug 15 and thence to the supply tank 1 at a uniform rate determined by the area of the orifice in the metering plug 15. Thus, water will be added to the water above the solution in the tank 1 at a uniform rate which will cause displacement of solution from the free column of solution at a rate likewise uniform and this displacement fluid will pass up the up-take pipe 31 through the passage 28 and thence through the delivery pipe 3 to the washing apparatus 4.

Another manner in which the tank 1 may be charged is as follows:

An amount of solution insufficient to bring the fluid level to the desired point is placed in the tank. Water is supplied through the water-supply line 21 to the metering chamber 17 and delivered through the orifice in the metering plug 15 to the supply tank 1 above the solution. This will cause the building up a column of water above the solution which will gradually, as it rises, cause the solution in the up-take pipe 31 to rise. When this column of water has risen to the predetermined point illustrated in Figs. 1 and 2, the column of solution in the up-take pipe 31 will be at the same level and thereafter as water is supplied from the metering chamber 17 into the tank 1, an equal quantity of solution is displaced and caused to rise upwardly in the up-take pipe 31. Thereafter, the fluid will be delivered through the passage 28 at a rate equivalent to the delivery of water from the metering chamber 17 through the orifice in the metering plug 15.

If it is desired to charge the solution tank of washing apparatus 4 through the solution supply tank 1, it is necessary to pour into the tank 1 a quantity of solution sufficient to provide the charge for the solution tank of washing apparatus 4 and also sufficient to fill the tank 1 to the desired point, as illustrated in Figs. 1 and 2. The amount of solution in excess of that sufficient to fill the tank 1 to the desired point will flow up through the up-take pipe 31 and thence through the delivery pipe 3 to the solution tank of the washing apparatus 4. Thereafter, by supplying water through the water-supply line 21, the operation of the metering apparatus may be initiated to supply to the tank 1 metered solution displacing water at a predetermined rate to cause the solution to flow from the tank 1 through the solution delivery passages to the solution tank in the washing apparatus 4.

Due to the calibration of the orifices in the interchangeable metering plugs 15, the rate of supply of solution to the washing apparatus 4 may be exactly regulated and as this is dependent only upon the rate of flow of water through the orifice in the metering plug 15, the rate of delivery of the solution may be varied by selecting and installing in the screw-threaded aperture in the wall 14 a plug having an orifice area of predetermined desired value.

As will be understood, the metering plugs are subjected to the flow of clear water only and this obviates clogging thereof and the necessity for cleaning. Likewise, as the rate of delivery of solution displacing water is determined by the orifice area of the plugs 15, the rate of solution delivery is uniform for each plug and the rate of delivery of solution may, therefore, be varied as desired by merely interchanging the plugs 15. The operation is, therefore, foolproof and requires no manual setting of variable valves by trial and error, and after the apparatus has been set in operation, it will continue to operate for the period designated by the indicia on the metering plug 15 which is used.

After the operating period of the device has elapsed, the tank 1 may be drained and cleaned, if necessary, by removal of the plug 37 which permits it to be flushed with water or other cleaning compound before another operative period is initiated.

The specific gravity of the solution used is preferably but slightly greater than the specific gravity of water. This difference in specific gravity will cause the column of water in the tank 1 to remain always above the column of water therein, especially, where the solution is non water miscible.

The principle of operation of the apparatus is such that the rate of delivery of the chemical solution and the concentration thereof is, at all times, uniform, during operation, and independent of the temperature of water supplied through the water-supply line 21 to the metering device. The rate of delivery is dependent only upon the rate of flow of water through the orifice in the drain plug 15 and is therefore totally independent of the specific gravity of the solution delivered from the solution delivery tank 1.

It will thus be seen that the apparatus of this invention is of simple construction and is extremely efficient in operation due to the simple principle of operation thereof whereby it requires no adjustment during operation, as it is merely necessary to provide the metering chamber with a metering plug 15 of desired predetermined orifice area and initiate operation thereof which is automatic throughout the operative period.

It is, of course, to be understood that the above discussed structure is merely illustrative of the application of the principles of this invention and that I desire to comprehend within my invention such modifications as come within the scope of the following claims and the invention.

Having thus fully described my invention, what I desire to claim and secure by Letters Patent is:

1. In means for delivering solutions heavier than water at constant rates, a solution delivery tank communicating with the atmosphere and adapted to contain a quantity of solution, regulator means secured to said tank and including means for supplying water to said tank above said solution at a predetermined rate and means responsive to supply of said water for withdrawing solution from said tank at a rate equal to the rate of water supply, said last-named means including a delivery passage in said regulator means, a delivery pipe leading from said passage, an up-take pipe in said tank extending from the lower end of said tank to said passage, and a vent pipe providing communication between said up-take pipe and the atmosphere.

2. In means for supplying at a constant rate solutions heavier than water, a solution containing tank communicating with the atmosphere, means for supplying water to said tank above said solution at a uniform predetermined rate, and means for withdrawing solution from said tank at an equal rate, said last-named means comprising a vented up-take pipe extending upwardly from said solution to a predetermined point, a solution delivery line, and a passage connecting said vented up-take pipe with said solution delivery line.

3. In combination with a solution supply tank, a regulator for feeding from such a solution comprising a unitary casting attached to said tank and including metering and overflow chambers having therebetween a separator wall of predetermined height, orifice defining means at the bottom of said metering chamber, a passage leading from said orifice defining means to the interior of said tank for supplying metered water thereto, and a solution delivery passage in said regulator connected with the lower portion of said tank and with the atmosphere.

4. In a method of feeding a compound heavier than water at a predetermined uniform rate, confining a quantity of compound into an open column, adding water to the surface of the column of compound to bring the level of water and compound to a predetermined level, displacing the compound at the predetermined level by supplying compound displacing water at a predetermined uniform rate to the surface of said column and thereby delivering compound at a uniform rate corresponding with the rate of water supply.

5. In a method of feeding liquid heavier than water, confining a quantity of liquid in an open column, adding water to the surface of the column to bring the level of water and compound to a predetermined level, permitting overflow of liquid from the lower portion of said column at the height substantially corresponding with said level, and supplying compound displacing water at a predetermined uniform rate to the surface of said column whereby to deliver compound therefrom at a uniform rate corresponding with the rate of water supply.

LE BARON B. JOHNSON.